United States Patent

Wilhelm

[15] 3,688,589
[45] Sept. 5, 1972

[54] WHEEL BALANCING PROBE
[72] Inventor: Larry A. Wilhelm, Lansing, Mich.
[73] Assignee: FMC Corporation, San Jose, Calif.
[22] Filed: May 20, 1970
[21] Appl. No.: 39,792

[52] U.S. Cl. ................................................73/457
[51] Int. Cl. .............................................G01m 1/28
[58] Field of Search...........73/66, 457, 458, 471–475

[56] References Cited

UNITED STATES PATENTS

| | | | |
|---|---|---|---|
| 3,461,729 | 8/1969 | Haynes | 73/457 |
| 2,782,641 | 2/1957 | Allen | 73/457 |
| 3,525,265 | 8/1970 | Harrison et al. | 73/473 |
| 3,478,602 | 11/1969 | Tatum | 73/462 |
| 2,383,405 | 8/1949 | Merrill et al. | 73/457 |
| 2,461,645 | 2/1949 | Kallmann | 73/473 |

*Primary Examiner*—Richard C. Queisser
*Assistant Examiner*—Herbert Goldstein
*Attorney*—F. W. Anderson, C. E. Tripp and J. F. Verhoeven

[57] ABSTRACT

A force sensitive probe is inserted between the vehicle frame and a portion of a steerable vehicle wheel, which portion is non-rotatable about the wheel axis, for determining the dynamic imbalance of the wheel without removing the wheel from the vehicle. A crystal in the probe generates a fluctuating signal as an unbalanced rotating wheel exerts a fluctuating force on the probe. The signal is transmitted to a read-out device to give an indication of the extent and location of the imbalance of the wheel.

5 Claims, 3 Drawing Figures

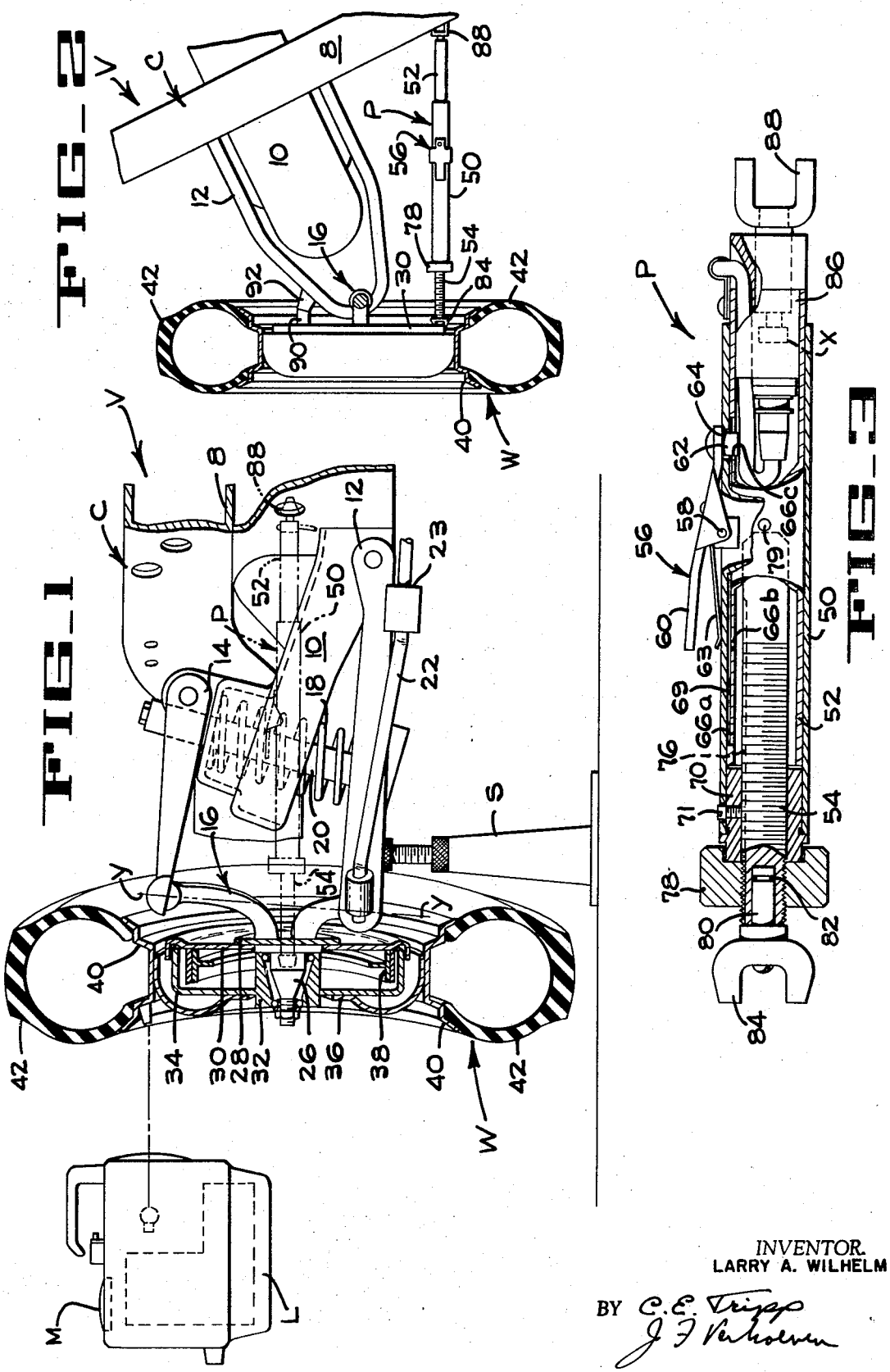

WHEEL BALANCING PROBE

BACKGROUND OF THE INVENTION

Static balance of a steerable vehicle wheel and tire assembly (which, for convenience, will be referred to merely as a vehicle wheel) will occur when the weight of the wheel is equally distributed around the axis of rotation of the wheel so that the wheel, when freely rotatable in a vertical plane, will have no tendency in any angular position to rotate by virtue of the force of gravity. Dynamic balance of a vehicle wheel occurs when it is in static balance and when no couples are generated during rotation about its axis tending to cause the rotating wheel to wobble from side-to-side.

Static imbalance creates wheel hopping, while dynamic imbalance causes wheel shimmy about the steering axis (that is, the kingpin or ball joint axis of the suspension). The inter-relation of the factors causing wheel imbalance is complex, and it is desirable that the static and dynamic imbalance of vehicle wheels be measured and corrected while the wheels are installed on the vehicle.

One type of apparatus for determining dynamic balance detects the side-to-side movement of the wheel as it wobbles during rotation to establish the amount and position of the counterbalancing weights which must be added to the wheel to eliminate the wobble. In some cases, a wobble of one-sixteenth to one-eighth of an inch may develop in the wheel which will generate vibrations in the vehicle, making it difficult to get accurate readings to indicate to the operator the required counterbalance weight and position of the weight during "on-the-car" testing.

Another type of apparatus for determining dynamic balance, and the type to which the invention disclosed herein is related, does not rely on the wobble movement of the wheel to get a reading but, instead, detects the fluctuating force which causes the wobble. Apparatus of this type has heretofore been disclosed in patents U.S. Pat. No. 3,452,603 to W. D. Kaiser et al., issued July 1, 1969, and U.S. Pat. No. 3,461,729 to Haynes issued Aug. 19, 1969, which patents are incorporated herein by reference. In this type of apparatus, since the side-to-side movement (or velocity) of the wobbling vehicle wheel is not required in on-the-car testing, the wheel can be held rigid (with respect to lateral movement) by the probe to eliminate the vibration during rotation of the wheel which tends to produce inaccurate test signals. Heretofore, the force responsive probes have been supported from the ground. However, the lateral, horizontal fluctuating force generated by an unbalanced wheel has tended to impart creep to the probe supporting structure to alter the response of the probe. The more rigidly the wheel can be held by the probe, and the more firmly the probe can be held against the wheel, the more accurately can the on-the-car wheel testing be accomplished.

SUMMARY OF THE INVENTION

There is provided by the present invention, a simple, sturdy force-responsive probe to sense the dynamic imbalance of a steerable wheel while it is mounted on the vehicle. In use, one end of the probe is engaged with the brake drum backing plate, which forms a portion of the wheel non-rotatable about the wheel axis, and the other end of the probe is engaged with the vehicle frame or other rigid chassis member. In the preferred form of the invention, the probe is extensible for a firm, tight fit between the vehicle wheel and chassis member. Preferably, the probe comprises three telescoping members. A first and second member can be latched at selected positions for a coarse adjustment of the length of the probe, and the second and third members can be adjusted by a threaded member for a fine adjustment of the length of the probe. With this construction, the probe can be easily wedged between the chassis member and the wheel to hold the wheel rigidly against vibration.

The probe, as the probe of patent U.S. Pat. No. 3,452,603, has a crystal which detects the fluctuating force applied to the probe by the dynamic imbalance of the steerable rotating wheel. As in the apparatus of the above patent, the dynamic probe of the present invention is used in conjunction with a vertical static probe which supports the vehicle to hold the wheel off the floor or ground and which detects the fluctuating force applied to the vertical probe by the static imbalance of the rotating wheel.

It is therefore one object of the present invention to provide a simple, rugged probe for insertion between a portion of a steerable vehicle wheel which does not rotate about the wheel axis, and a rigid member of the vehicle chassis, such as the frame, to detect the dynamic imbalance of the wheel.

It is another object of the present invention to provide a probe which is extensible for wedging between the wheel and a rigid chassis member of the vehicle.

BRIEF DESCRIPTION OF THE DRAWINGS

FIG. 1 is a view in perspective with portions in cross section of the vehicle wheel assembly showing the probe of the present invention in phantom lines.

FIG. 2 is a view in plan of the vehicle wheel assembly showing the probe engaged between the frame and the wheel assembly.

FIG. 3 is a view in cross section of the dynamic probe of the present invention.

DESCRIPTION OF THE PREFERRED EMBODIMENT

Referring to FIGS. 1 and 2, the probe assembly P of the present invention is shown in position for testing the imbalance of the right front wheel W on an independently sprung front suspension vehicle V, such as an automobile. The suspension illustrated is merely representative of any one of a number of suspensions to which the probe is adaptable, as will be apparent to those skilled in the art when the construction of the probe assembly is described in detail.

The vehicle has a chassis C which includes a frame member 8 and a frame cross member 10 on which is mounted a lower control arm 12 and an upper control arm 14. These arms pivotally support the front wheel hub spindle 16 for steering about the generally vertical axis $y$-$y$ by conventional steering mechanism, not shown. Mounted between the control arm 12 and the frame member 10 is a spring 18 and a shock absorber 20 of conventional design. Also shown is a conventional sway bar 22 which is secured at each end to the lower control arm 12, and which has a pivotal mounting 23 on a frame portion not shown in the drawings.

The spindle 16, which is of conventional construction, includes a spindle shaft 26 and a flange 28 to which the brake backing plate 30 is secured. A hub 32 carries the brake drum 34 to which the wheel center 36 is secured. The brake backing plate, which constitutes a portion of the wheel assembly non-rotatable about the wheel axis, supports the brake members 38 for selective braking engagement with the rotatable brake drum. The wheel center 36 has a rim 40 on which a tire 42 is mounted. The spindle 16, backing plate 30 (or brake caliper support in the case of disc brakes), hub 32, brake drum 34, wheel center 36, brake members 38, rim 40, tire 42, and the steering arm (not shown) collectively constitute the steerable wheel assembly W which, for convenience, may be referred to merely as the wheel. As used herein, the term "frame" shall include frame member 8, frame cross member 10, and any rigid member attached thereto.

As shown in FIG. 3, the dynamic probe P has three members in telescopic relationship, an outer tube 50, an inner tube 52, and a screw 54. A latch 56 is pivotally connected, at 58, to the outer tube. The latch has a handle 60 and has a pin 62 at the end opposite the handle. The latch is normally biased by spring 63 in a clockwise direction (as viewed in FIG. 3) about pivot point 58 to urge the pin 62 into an opening 64 in the outer tube. The inner tube 52 has four spaced apart openings 66a, 66b, 66c, and an opening not shown, each of which will receive the pin 62 when one or the other of said inner tube openings is aligned with opening 64 in the outer tube. Thus, the outer and inner tubes of the probe can, by depressing the latch handle 60, be shifted longitudinally with respect to each other to either extend the probe (when pin 62 is aligned with opening 66a) or retract the probe (when pin 62 is aligned with opening 66b). The latch 56, when the handle is released, will lock the probe in either extended or retracted relationship to provide a coarse adjustment for the probe. It will be noted that the longitudinal portion of the upper surface of the inner tube is flattened at 69 to permit clearance with the pin 62 when the handle 60 is depressed. The rear end of the inner tube, which is not flattened, will not clear pin 62 so that the inner tube 52 will not fall out of the outer tube 50.

A bushing 70 is secured by screw 71 in the outer tube 50, beyond one end of the inner tube 52. The bushing slidably receives the screw 54 which is received inside the inner tube with clearance. Screw 54 is keyed to the outer tube by the screw 71 which extends through bushing 70 into slot 76 of the screw. The screw 54 can slide out of the tubes until the screw 71 abuts against the end of slot 76. A nut 78 received on screw 54 outside the tubes will prevent retraction of the screw into the tubes to hold the screw in an extended position relative to the tubes as determined by the setting of the nut. Thus, the nut 78 provides a fine adjustment of the length of the probe. A pin 79 through the inner tube 52 acts as a stop to define the extreme inner position of screw 54.

A pin 80 is received in the outer end of screw 54, and held therein by O-ring 82. A magnet 84 is secured to the pin and is flattened at the outer end for engagement with the brake backing plate of the vehicle wheel. At the other end of the probe, a dynamic probe head 86, which may be similar to the rigid dynamic probe element of the patent U.S. Pat. No. 3,452,603 or the dynamic probe head of the patent U.S. Pat. No. 3,461,729, is received in the end of the inner tube 52. The probe head has a crystal X which responds to pressure applied thereto to generate a signal. A forked contact member 88, which is mounted in the dynamic probe element, or head, in the same manner as the plunger nose of the dynamic probe of patent U.S. Pat. No. 3,461,729, is freely slidable (to a limited extent) in the probe head. The forked contact member engages the frame member so that the forces generated by dynamic imbalance in the wheel will be transmitted to the crystal.

The dynamic probe of the present invention may be used in conjunction with a static probe S and a stroboscopic unit L with readout meters M, as the dynamic probes of the apparatus shown in patents U.S. Pat. No. 3,452,603 3,452,603 and U.S. Pat. No. 3,461,729, and the electronic equipment used in conjunction with the probes for determining the imbalance of the wheels may be as described in the patent U.S. Pat. No. 3,452,603.

In use, the vehicle is first elevated so that the static probe can be inserted under the lower control arm 12. The wheel is then turned outwardly until stop 90 on the brake backing plate engages stop 92 on the lower control arm. The dynamic probe of the present invention is positioned between the brake backing plate, which is a portion of the wheel non-rotatable about the wheel axis, and some rigid portion of the chassis, such as the frame, or any bracket or rigid member connected to the frame. Initially, the latch is set with the pin in either opening 66a of the inner tube (if the distance between the brake backing plate and the rigid frame portion requires the extension of the probe) or in one of the other openings in the inner tube if a shorter probe is needed. Thereafter, the screw 54 is extended to bring the magnet into firm contact with the brake backing plate. The nut 78 is then turned until it abuts the end of bushing 70 which prevents the screw from retracting into the inner tube. Thereafter, the nut can be turned to preload the crystal and to wedge the probe tightly between the wheel and the frame. The firm, solid mounting of the probe will hold the wheel rigidly against its stop, and will produce accurate determination of wheel imbalance unaffected by vibration of the wheel and other vehicle structure.

After the probes are in position, the wheel is spun by a conventional wheel spinner, and the wheel balancing is carried out as described fully in the patents U.S. Pat. No. 3,452,603 or U.S. Pat. No. 3,461,729.

Although the best mode contemplated for carrying out the present invention has been herein shown and described, it will be apparent that modification and variation may be made without departing from what is regarded to be the subject matter of the invention.

What is claimed is:

1. The method of determining the dynamic imbalance of a wheel and pneumatic tire with a linear force sensitive adjustable probe while the wheel is mounted in operative position on a vehicle that has springs interposed between its wheels and chassis, the wheel being balanced having a rotatable portion and a non-rotatable portion mounted on the chassis of the vehicle comprising; the steps of raising the wheel off its supporting surface, inserting the linear probe in testing position between a non-rotatable portion of the wheel and the chassis, adjusting the length of the probe causing one end of the probe to firmly contact the non-rotatable portion of the wheel and causing the other end of the probe to directly contact a portion of the vehicle chassis, rotating the wheel, and detecting the fluctuating force applied to the probe.

2. A method according to claim 1 wherein said adjustment step includes making a preliminary coarse linear adjustment of the probe, and thereafter making a fine adjustment of the probe to thereby improve the sensitivity of the probe.

3. The method of mounting a linear force sensitive adjustable dynamic probe for determining the dynamic imbalance of a steerable wheel and pneumatic tire while the wheel is mounted in operative position on a vehicle that has springs interposed between its wheels and chassis, the wheel being balanced having a rotatable portion and a non-rotatable portion comprising; the steps of raising the wheel off its supporting surface, turning the steerable wheel to one extreme of its turning radius, inserting the linear probe in testing position between a portion of the wheel and the chassis, adjusting the length of the probe causing one end of the probe to firmly contact a non-rotatable portion of the wheel and the other end of the probe to directly contact a portion of the vehicle chassis immediately adjacent the wheel, and locking the probe in the adjusted position.

4. A method according to claim 3 wherein said linear adjustment includes a first coarse telescopic adjustment of the probe and a second fine telescopic adjustment of the probe to thereby provide a snug engagement for improving the sensitivity of the probe.

5. A force sensitive probe for insertion between a portion of a vehicle wheel which is non-rotatable about the wheel axis and a portion of the resiliently supported vehicle chassis for determining the dynamic imbalance of a wheel having a pneumatic tire thereon while the wheel is mounted in operative position on a vehicle comprising; a first member having one end adapted to directly engage one of said vehicle portions, a second member axially aligned with said first member and received in telescoping relation to said first member, latch means to lock said second member in selected position relative to said first member for coarse adjustment of the length of the probe, a threaded third telescopic member axially aligned with said first and second members and received in said second member for free outward slidable adjustment with respect to said second member, said third member having an outer end adapted to engage the other of said vehicle portions upon slidable extension of said third member relative to said second member, and a threaded nut on said third member for adjustment against said second member for providing fine adjustment of the length of said probe.

* * * * *